(12) United States Patent
Patel et al.

(10) Patent No.: US 9,336,779 B1
(45) Date of Patent: May 10, 2016

(54) DYNAMIC IMAGE-BASED VOICE ENTRY OF UNLOCK SEQUENCE

(71) Applicant: Google Inc., Mountain View, CA (US)

(72) Inventors: Nirmal Patel, Sunnyvale, CA (US); Yury Pinsky, Mountain View, CA (US)

(73) Assignee: Google Inc., Mountain View, CA (US)

( * ) Notice: Subject to any disclaimer, the term of this patent is extended or adjusted under 35 U.S.C. 154(b) by 449 days.

(21) Appl. No.: 13/860,417

(22) Filed: Apr. 10, 2013

(51) Int. Cl.
G10L 21/00 (2013.01)
G10L 15/00 (2013.01)
G10L 17/00 (2013.01)
G06F 21/32 (2013.01)

(52) U.S. Cl.
CPC ............... *G10L 17/005* (2013.01); *G06F 21/32* (2013.01)

(58) Field of Classification Search
CPC ... G10L 15/0022; G10L 15/265; G10L 17/00; G10L 17/005; G10L 17/22; G10L 17/24; G10L 2015/22; G10L 2015/223; G10L 2015/225; G10L 2015/228; H04W 12/00; H04W 12/02; H04W 12/06; H04W 12/08; H04W 12/12; G06F 21/70; G06F 21/88; H04M 3/382; H04M 3/385
USPC ......... 704/231, 246, 249, 247, 251, 252, 254, 704/235, 270, 270.1, 275; 379/88.01; 455/410, 411; 726/2, 5, 4, 34, 35
See application file for complete search history.

(56) References Cited

U.S. PATENT DOCUMENTS

| | | | |
|---|---|---|---|
| 6,209,102 B1 | 3/2001 | Hoover | |
| 6,801,765 B1 * | 10/2004 | Roo et al. | 455/411 |
| 7,219,368 B2 * | 5/2007 | Juels et al. | 726/2 |
| 7,370,209 B2 | 5/2008 | Gaither et al. | |
| 7,849,323 B2 | 12/2010 | Field et al. | |
| 7,877,707 B2 | 1/2011 | Westerman et al. | |
| 8,117,458 B2 | 2/2012 | Osborn, III et al. | |
| 8,127,254 B2 | 2/2012 | Lindberg et al. | |
| 8,145,912 B2 | 3/2012 | McLean | |
| 8,315,876 B2 * | 11/2012 | Reuss | 704/273 |
| 8,336,086 B2 * | 12/2012 | Seo | 726/5 |
| 8,355,698 B2 | 1/2013 | Teng et al. | |
| 8,402,533 B2 * | 3/2013 | LeBeau et al. | 726/17 |

(Continued)

OTHER PUBLICATIONS

Mohd Afizi Mohd Shukran, Kinect-based Gesture Password Recognition, Australian Journal of Basic and Applied Sciences, 6(8), 2013, pp. 492-499.

(Continued)

*Primary Examiner* — Paras D Shah
(74) *Attorney, Agent, or Firm* — McDonnell Boehnen Hulbert & Berghoff LLP

(57) ABSTRACT

Embodiments described herein may help to provide a lock-screen for a computing device. An example method involves: (a) while a computing device is locked, displaying an interface that comprises a fixed arrangement of input regions, wherein an image from a set of images is displayed in each input region, and wherein each input region is associated with an image-name for the image that is displayed in the input region, (b) receiving audio data that comprises speech, (c) detecting a sequence of one or more of the image-names in the speech, (d) determining an input sequence based on the input regions that are associated with the detected sequence of image-names, (e) determining whether or not the input sequence matches a predetermined unlock sequence, and (f) if the input sequence matches the predetermined unlock sequence, then unlocking the computing device.

16 Claims, 11 Drawing Sheets

(56) References Cited

U.S. PATENT DOCUMENTS

| | | | | |
|---|---|---|---|---|
| 8,564,402 B2* | 10/2013 | Saotome | ............ | 340/5.64 |
| 2002/0152070 A1* | 10/2002 | Oda | ............ | 704/246 |
| 2005/0060554 A1* | 3/2005 | O'Donoghue | ............ | 713/183 |
| 2007/0130618 A1* | 6/2007 | Chen | ............ | 726/8 |
| 2008/0244700 A1* | 10/2008 | Osborn et al. | ............ | 726/2 |
| 2010/0011419 A1* | 1/2010 | Seo | ............ | 726/5 |
| 2010/0083353 A1* | 4/2010 | Wang | ............ | 726/5 |
| 2012/0050008 A1* | 3/2012 | Rosener | ............ | G07C 9/00142 340/5.21 |
| 2012/0245941 A1* | 9/2012 | Cheyer | ............ | 704/246 |
| 2013/0036461 A1* | 2/2013 | Lowry | ............ | G06F 21/36 726/19 |
| 2013/0057496 A1 | 3/2013 | Hong et al. | | |
| 2013/0063345 A1 | 3/2013 | Maeda | | |
| 2013/0081133 A1* | 3/2013 | Hetroy | ............ | 726/16 |
| 2013/0111408 A1* | 5/2013 | Berus | ............ | 715/835 |
| 2013/0189952 A1* | 7/2013 | Kim | ............ | 455/411 |
| 2013/0297319 A1* | 11/2013 | Kim | ............ | 704/275 |
| 2014/0012586 A1* | 1/2014 | Rubin et al. | ............ | 704/273 |
| 2015/0067829 A1* | 3/2015 | Liu | ............ | G06F 3/04817 726/19 |

OTHER PUBLICATIONS

Steven Sinofsky, Signing in with a Picture Password, Building Windows 8—Site Home—MSDN Blogs, Dec. 16, 2011.

* cited by examiner

DYNAMIC IMAGE-BASED VOICE ENTRY OF UNLOCK SEQUENCE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Example methods provide interfaces for unlocking a computing device, such as a head-mountable device (HMD). In an example embodiment, a lock-screen interface displays number of input regions. In some case, an unlock sequence may be defined as a sequence of these input regions. In other cases, the input regions may be associated with certain symbols from which an unlock sequence can be composed. The user may input a given input region or the symbol associated with a given input region by speaking the name of the subject in an image that is shown in the input region. Accordingly, the symbols in an unlock sequence may be indicated by speaking the names of the images in the same input regions as the symbols in the sequence.

Further, the input region may be displayed in the same arrangement each time the lock-screen interface is displayed, while images that are displayed may be dynamically assigned to input regions, such that the particular input regions in which particular images are displayed is variable each time the lock-screen interface is displayed. Moreover, when an unlock sequence is made up from symbols that are associated with the input regions, the symbols may be statically assigned to input regions, such that each symbol is displayed in the same input region each time the lock-screen interface is displayed. However, the images that are displayed in the input regions may be dynamically updated each time the lock-screen interface is displayed. Therefore, it may be difficult to determine the underlying unlock sequence of input regions or symbols when a user inputs the unlock sequence by speaking the images names associated with the input regions or symbols in the unlock sequence.

In one aspect, computing device includes a non-transitory computer readable medium and program instructions stored on the non-transitory computer readable medium and executable by at least one processor. The program instructions may be executable to: (a) while a computing device is locked, cause a display of the computing device to display an interface comprising a fixed arrangement of input regions, wherein an image from a set of images is displayed in each input region, and wherein each input region is associated with an image-name for the image that is displayed in the input region, (b) receive audio data that comprises speech, (c) detect a sequence of one or more of the image-names in the speech, (d) determine an input sequence comprising the one or more input regions that are associated with the detected sequence of one or more image-names, (e) determine whether or not the input sequence matches a predetermined unlock sequence, (f) when the input sequence matches the predetermined unlock sequence, unlock the computing device, and (g) when the input sequence does not match the predetermined unlock sequence, refrain from unlocking the computing device.

In another aspect, a computer-implemented method involves: (a) while a computing device is locked, displaying an interface that comprises a fixed arrangement of input regions, wherein an image from a set of images is displayed in each input region, and wherein each input region is associated with an image-name for the image that is displayed in the input region, (b) receiving audio data that comprises speech, (c) detecting a sequence of one or more of the image-names in the speech, (d) determining an input sequence based on the one or more input regions that are associated with the detected sequence of one or more image-names, (e) determining whether or not the input sequence matches a predetermined unlock sequence, (f) if the input sequence matches the predetermined unlock sequence, then unlocking the computing device, and (g) if the input sequence does not match the predetermined unlock sequence, then refraining from unlocking the computing device.

In another aspect, a non-transitory computer readable medium has stored therein instructions executable by a computing device to cause the computing device to perform functions comprising: (a) while a computing device is locked, displaying an interface that comprises a fixed arrangement of input regions, wherein an image from a set of images is displayed in each input region, and wherein each input region is associated with an image-name for the image that is displayed in the input region, (b) receiving audio data that comprises speech, (c) detecting a sequence of one or more of the image-names in the speech, (d) determining an input sequence based on the one or more input regions that are associated with the detected sequence of one or more image-names, (e) determining whether or not the input sequence matches a predetermined unlock sequence, (f) when the input sequence matches the predetermined unlock sequence, unlocking the computing device, and (g) when the input sequence does not match the predetermined unlock sequence, refraining from unlocking the computing device.

These as well as other aspects, advantages, and alternatives will become apparent to those of ordinary skill in the art by reading the following detailed description, with reference where appropriate to the accompanying drawings.

DETAILED DESCRIPTION

Figure 1A:
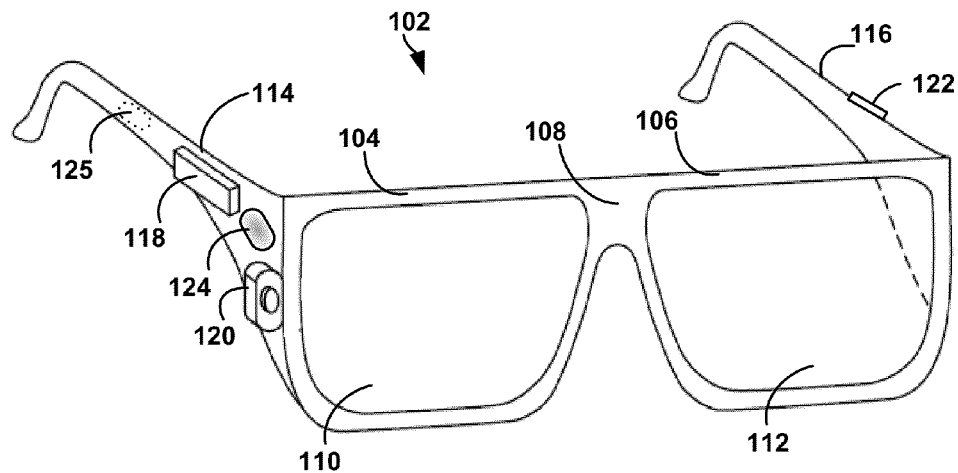
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example methods provide interfaces for unlocking a computing device, such as a head-mountable device (HMD), mobile phone, tablet computer, or laptop computer, among others. In an example embodiment, a lock-screen interface includes number of input regions, which may each correspond to a different symbol (e.g., a number) and a different image. An unlock sequence may be defined as a sequence of symbols (e.g., a sequence of four numbers). The user may indicate a given symbol by speaking the name of the subject in the image that is shown in the same input region as the symbol. Accordingly, the symbols in an unlock sequence may be indicated by speaking the names of the images in the same input regions as the symbols in the sequence.

In an example embodiment, the symbols may be statically mapped to input regions, while images are dynamically mapped to different input regions each time the lock-screen is displayed. For example, the HMD may display the numbers in the same input regions each time the lock screen is displayed, but randomize which images are displayed in which input regions, each time the HMD displays the lock screen. Thus, while the symbols in the unlock sequence will remain the same each time a user enters their unlock sequence, the sequence of image names that the user must say to enter the symbols in the unlock sequence, may differ each time the user enters the unlock sequence, depending upon the particular images that are displayed in the input regions with the symbols making up the unlock sequence.

Note that in some embodiments, an unlock sequence may be a sequence of input regions in certain locations in the display, rather than symbols that are statically associated with the input regions. Further, the input regions may be displayed in a fixed arrangement each time the lock-screen is displayed. Thus, when the unlock sequence is composed of input regions, the computing device might only display the images in the input regions, assuming that the user will remember the locations of the input regions in the unlock sequence, so that they know which images names to recite to indicate the input regions in the unlock sequence.

In a further aspect, when the unlock sequence is composed of symbols, the symbols need not be numbers. For instance, some or all of the symbols could letters or other types of symbols. Further, the types of images displayed in the input regions may vary.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD). An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
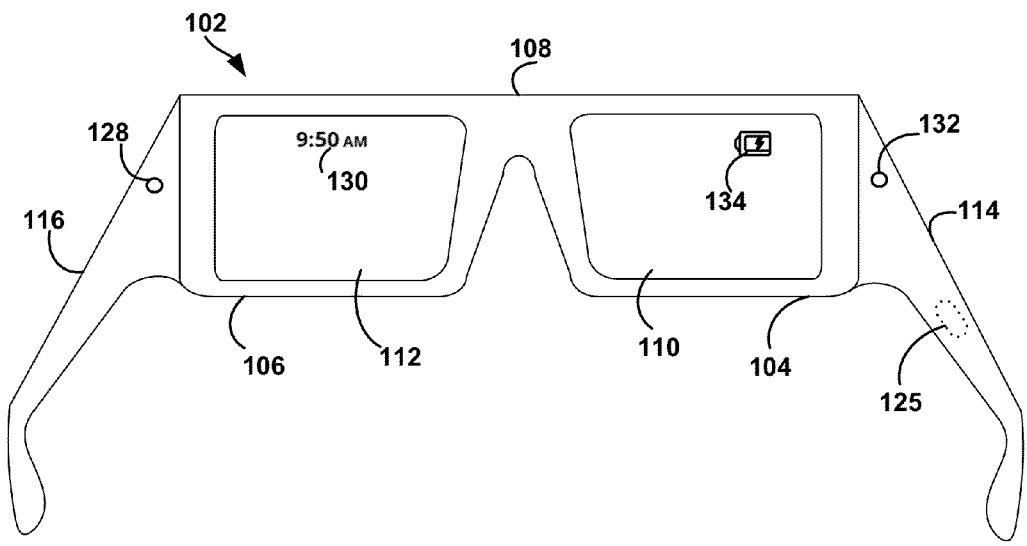
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
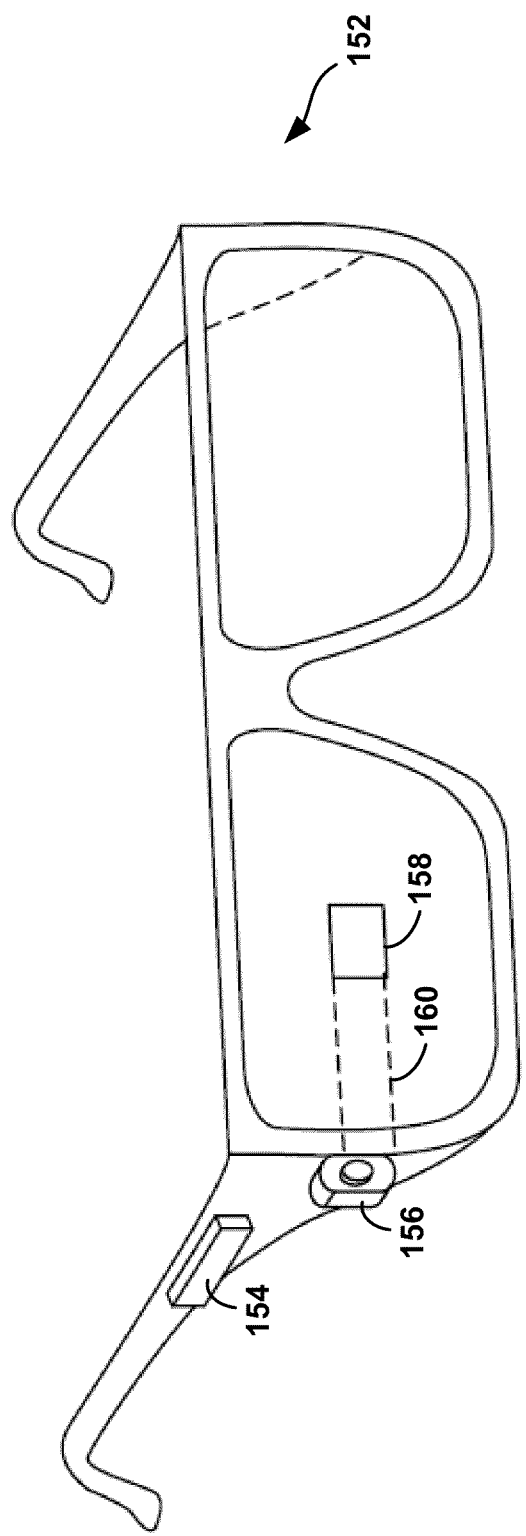
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
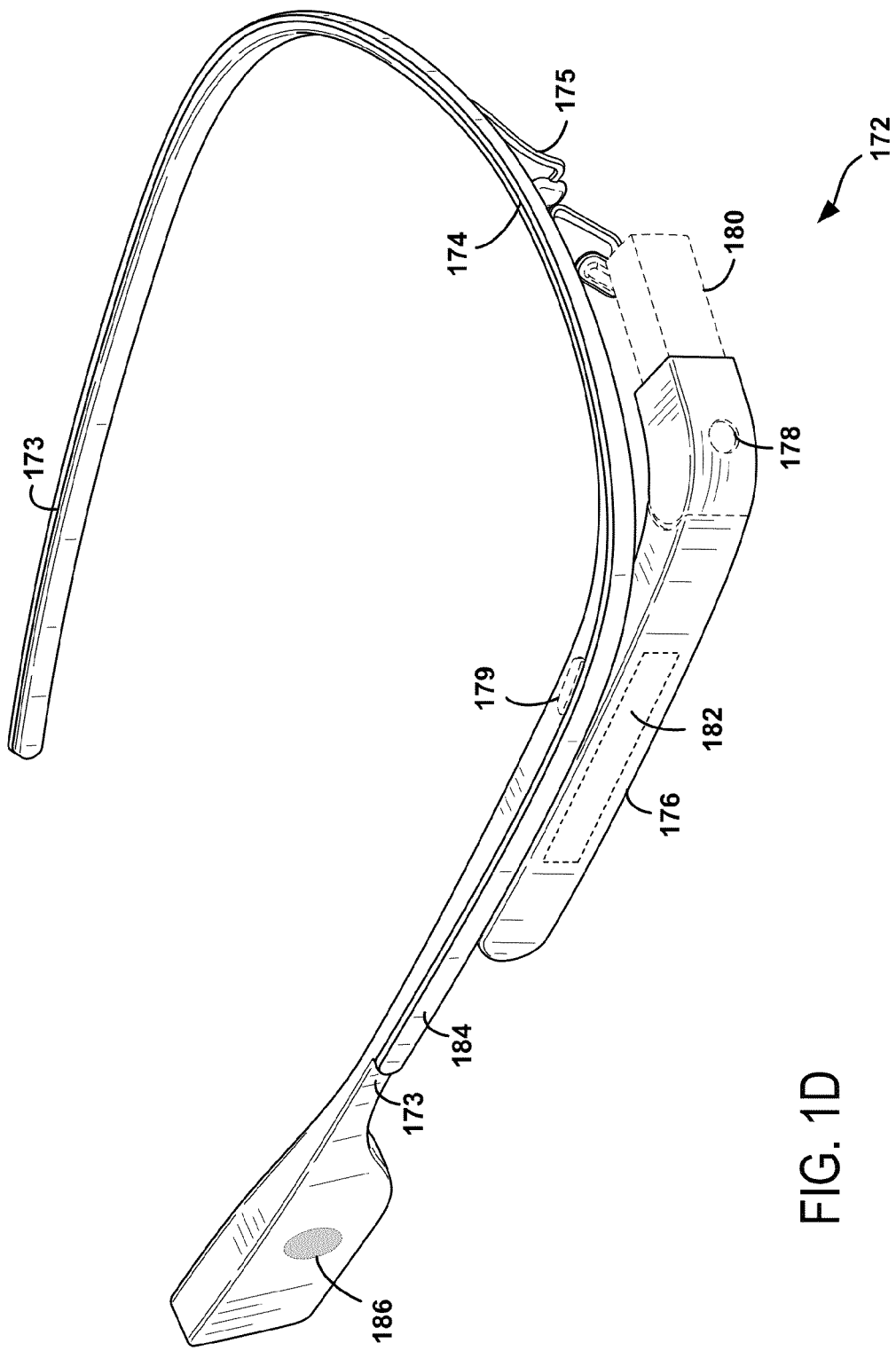
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
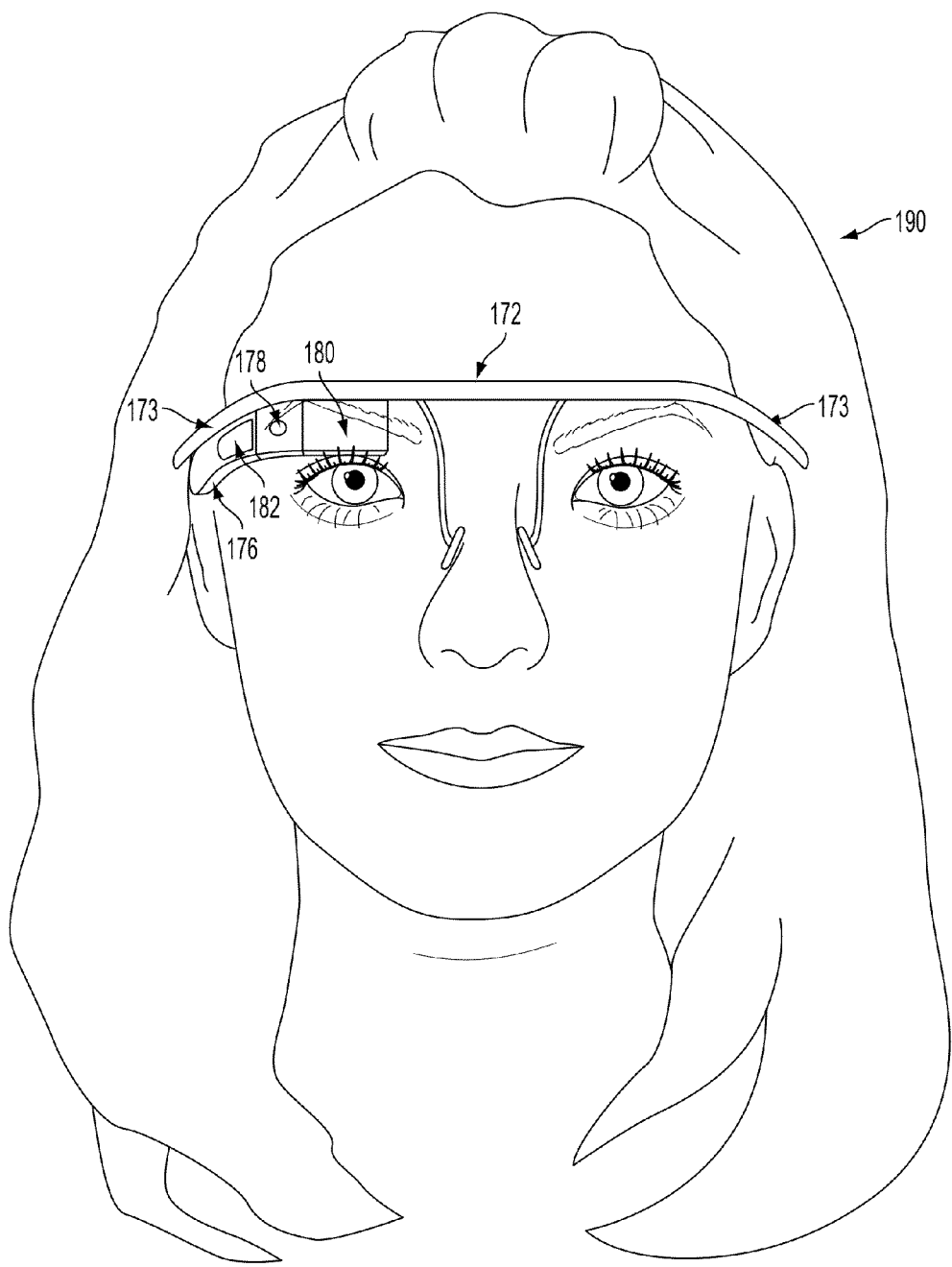
FIGS. 1E to 1G are simplified illustrations of the wearable computing system shown in FIG. 1D, being worn by a wearer.
Figure 1F:
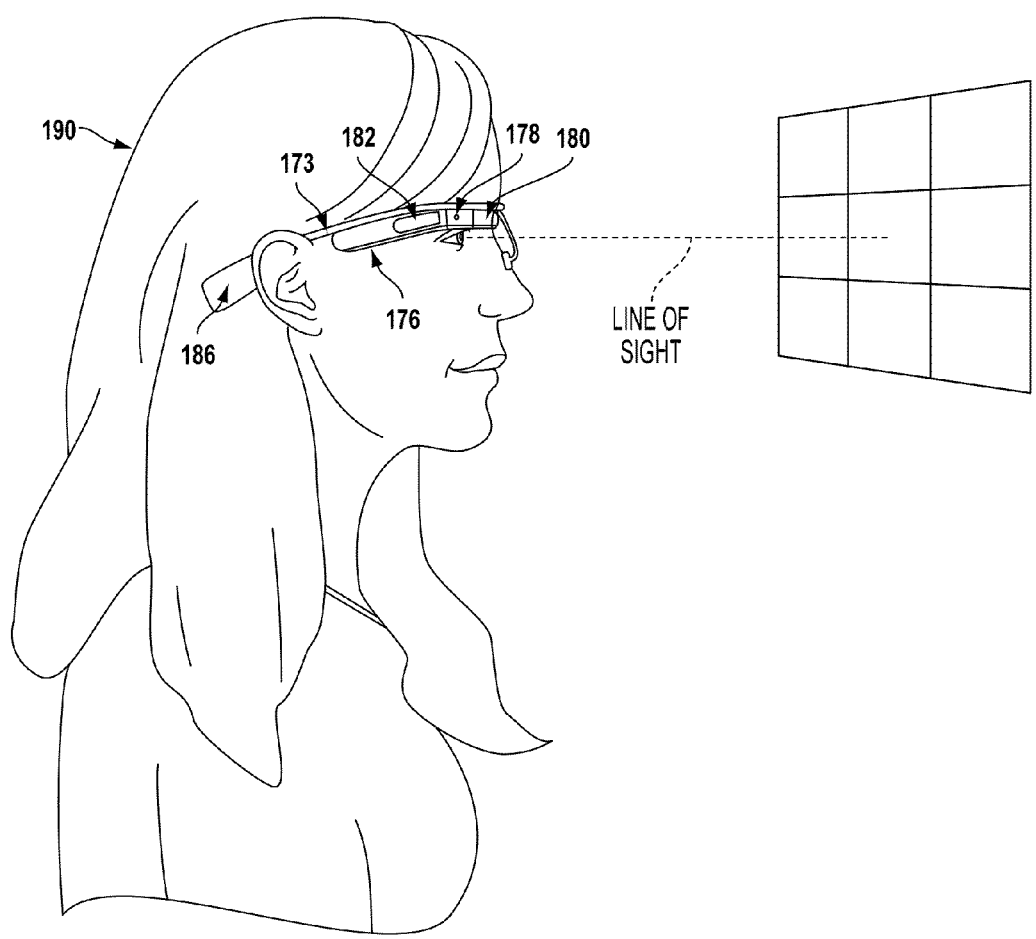
Figure 1G:
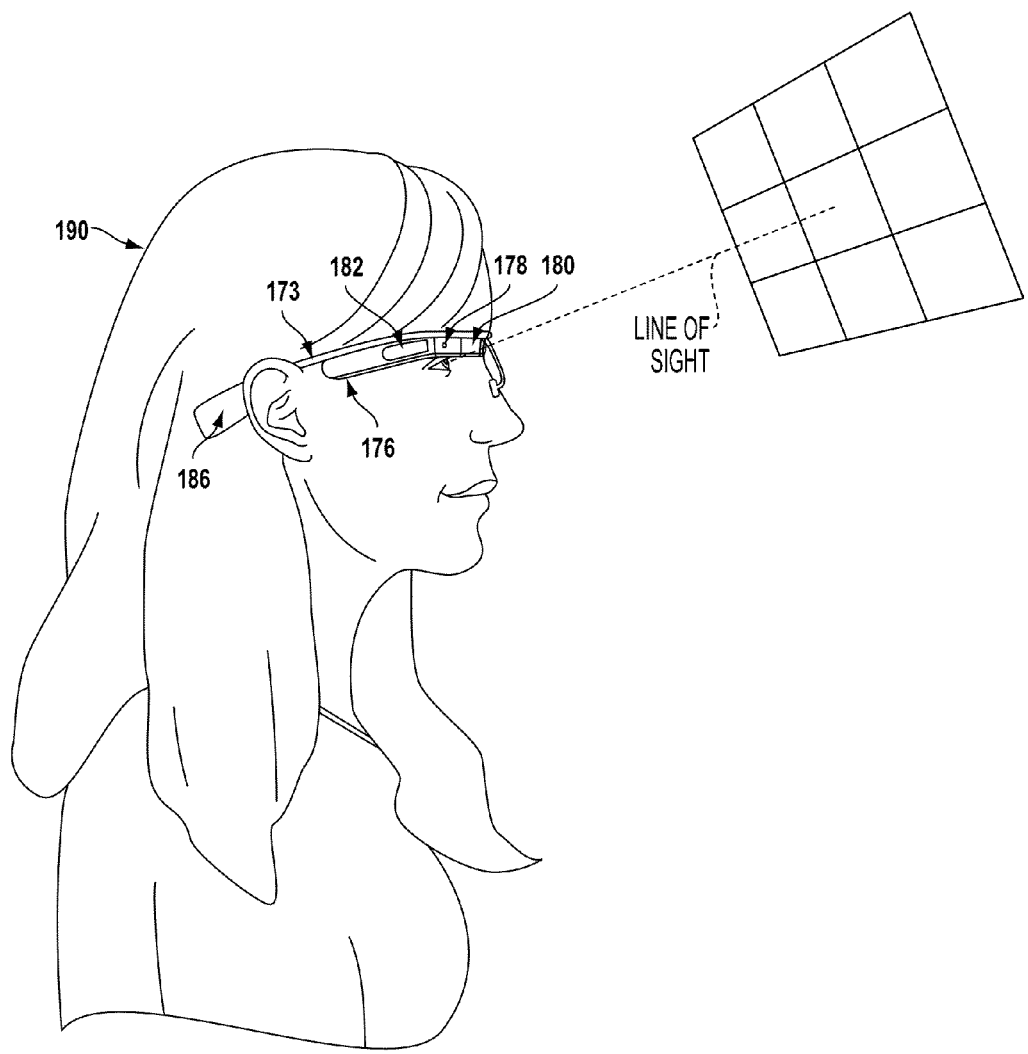

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
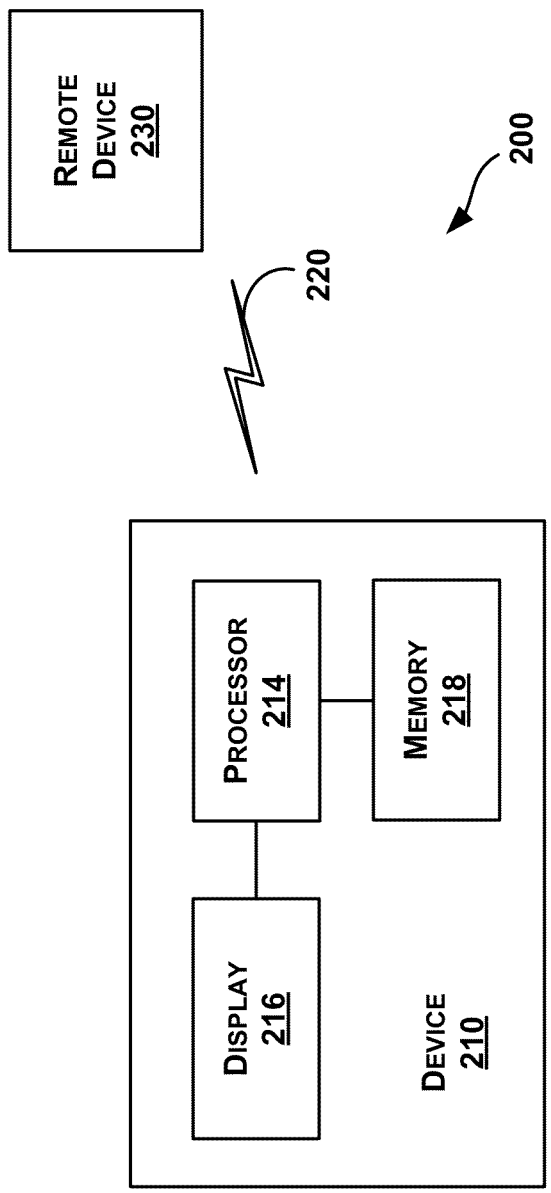
FIG. 2A is a simplified block diagram of a computing device according to an example embodiment.

FIG. 2A is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2B:
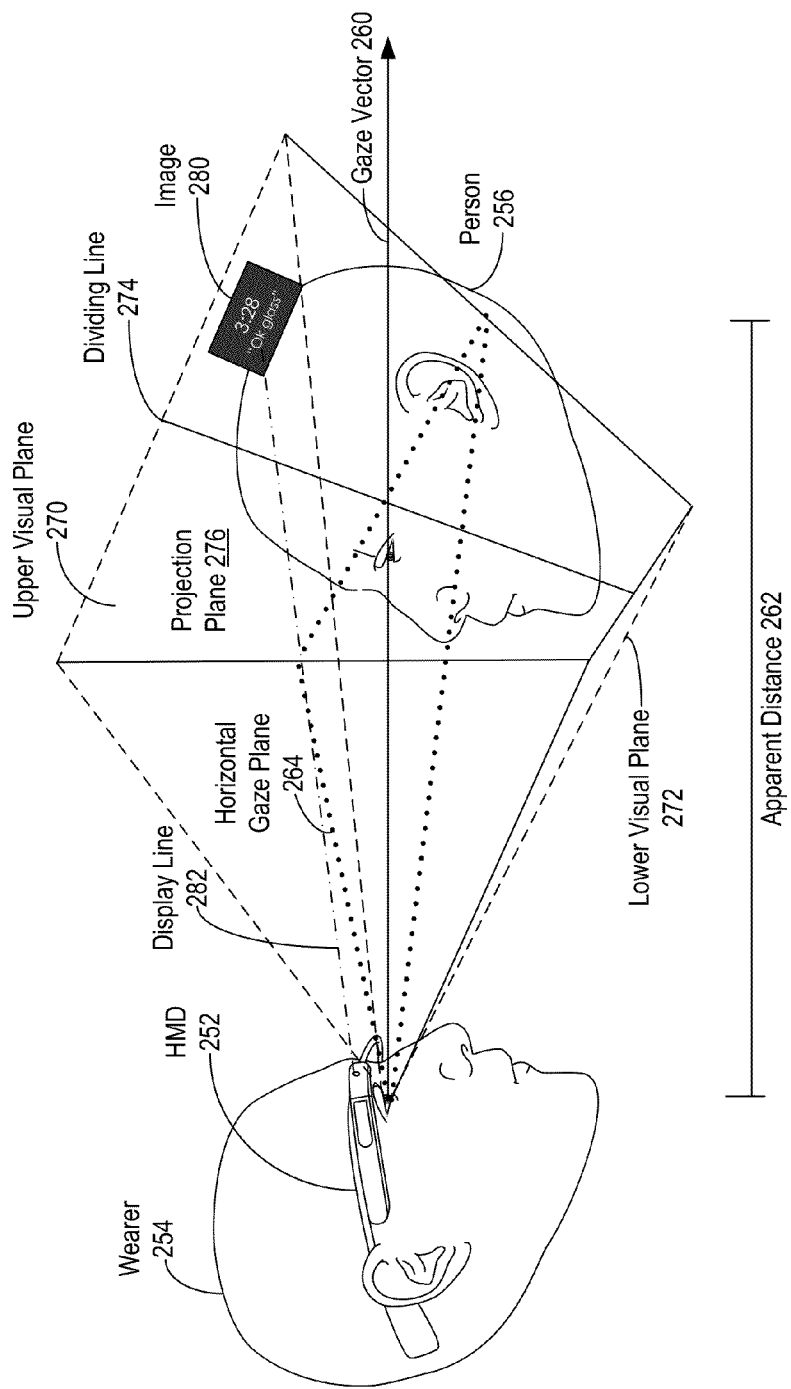
FIG. 2B shows a projection of an image by a head-mountable device, according to an example embodiment.

FIG. 2B shows an example projection of UI elements described herein via an image 280 by an example head-mountable device (HMD) 252, according to an example embodiment. Other configurations of an HMD may be also be used to present the UI described herein via image 280. FIG. 2B shows wearer 254 of HMD 252 looking at an eye of person 256. As such, wearer 254's gaze, or direction of viewing, is along gaze vector 260. A horizontal plane, such as horizontal gaze plane 264 can then be used to divide space into three portions: space above horizontal gaze plane 264, space in horizontal gaze plane 264, and space below horizontal gaze plane 264. In the context of projection plane 276, horizontal gaze plane 260 appears as a line that divides projection plane into a subplane above the line of horizontal gaze plane 260, a subplane a subspace below the line of horizontal gaze plane 260, and the line where horizontal gaze plane 260 intersects projection plane 276. In FIG. 2B, horizontal gaze plane 264 is shown using dotted lines.

Additionally, a dividing plane, indicated using dividing line 274 can be drawn to separate space into three other portions: space to the left of the dividing plane, space on the dividing plane, and space to right of the dividing plane. In the context of projection plane 276, the dividing plane intersects projection plane 276 at dividing line 274. Thus the dividing plane divides projection plane into: a subplane to the left of dividing line 274, a subplane to the right of dividing line 274, and dividing line 274. In FIG. 2B, dividing line 274 is shown as a solid line.

Humans, such wearer 254, when gazing in a gaze direction, may have limits on what objects can be seen above and below the gaze direction. FIG. 2B shows the upper visual plane 270 as the uppermost plane that wearer 254 can see while gazing along gaze vector 260, and shows lower visual plane 272 as the lowermost plane that wearer 254 can see while gazing along gaze vector 260. In FIG. 2B, upper visual plane 270 and lower visual plane 272 are shown using dashed lines.

The HMD can project an image for view by wearer 254 at some apparent distance 262 along display line 282, which is shown as a dotted and dashed line in FIG. 2B. For example, apparent distance 262 can be 1 meter, four feet, infinity, or some other distance. That is, HMD 252 can generate a display, such as image 280, which appears to be at the apparent distance 262 from the eye of wearer 254 and in projection plane 276. In this example, image 280 is shown between horizontal gaze plane 264 and upper visual plane 270; that is image 280 is projected above gaze vector 260. In this example, image 280 is also projected to the right of dividing line 274. As image 280 is projected above and to the right of gaze vector 260, wearer 254 can look at person 256 without image 280 obscuring their general view. In one example, the display element of the HMD 252 is translucent when not active (i.e. when image 280 is not being displayed), and so the wearer 254 can perceive objects in the real world along the vector of display line 282.

Other example locations for displaying image 280 can be used to permit wearer 254 to look along gaze vector 260 without obscuring the view of objects along the gaze vector. For example, in some embodiments, image 280 can be projected above horizontal gaze plane 264 near and/or just above upper visual plane 270 to keep image 280 from obscuring most of wearer 254's view. Then, when wearer 254 wants to view image 280, wearer 254 can move their eyes such that their gaze is directly toward image 280.

III. ILLUSTRATIVE METHODS

As noted above, a predetermined unlock sequence that unlocks a computing device may correspond to a sequence of input regions or symbols associated with such input regions. The input regions and/or the symbols may be displayed in the same location each time a lock-screen is accessed, while images that are displayed in the input regions may be displayed in different input regions each time the lock-screen is accessed.

Figure 3:
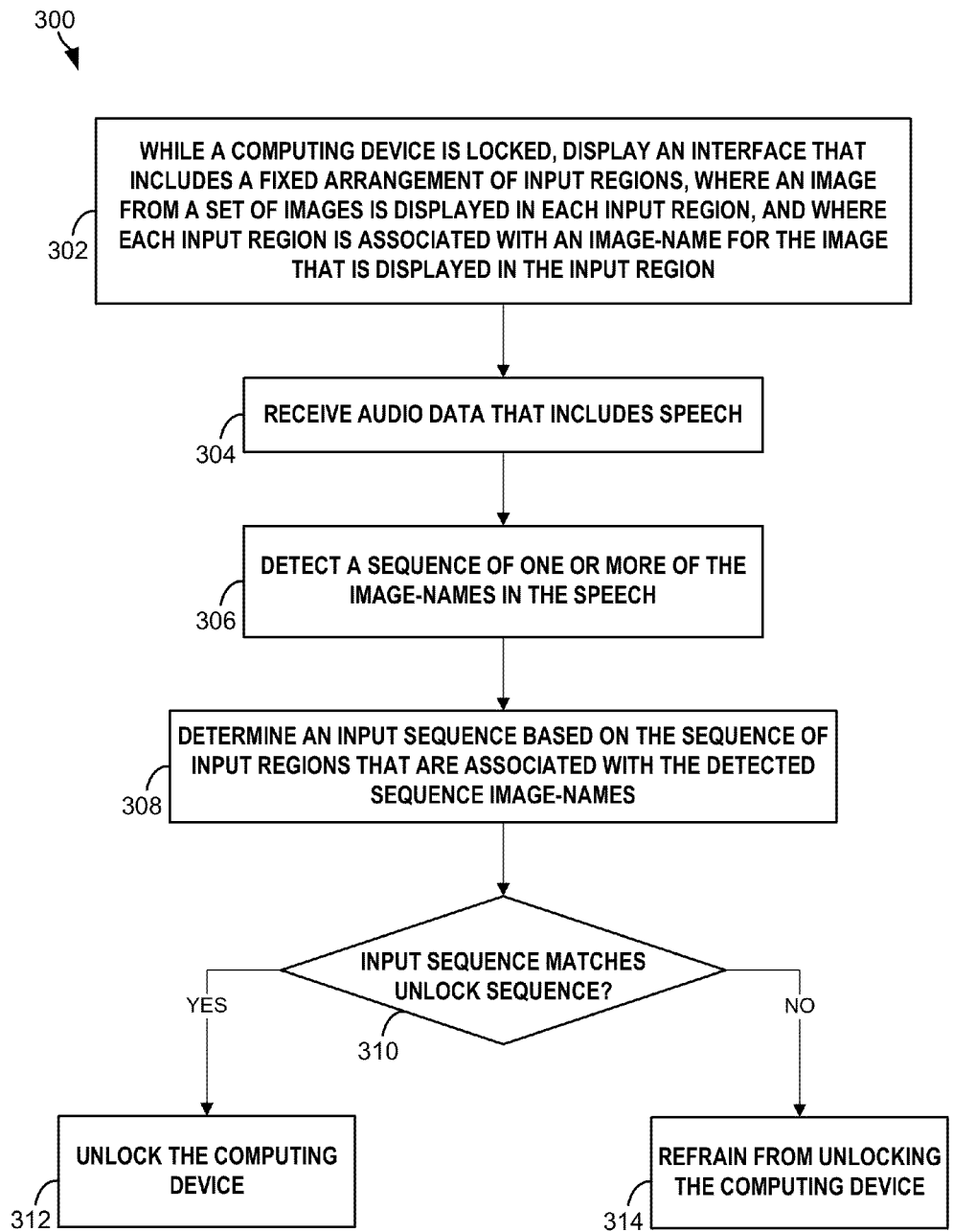
FIG. 3 is a flow chart illustrating a method 300, according to an example embodiment.

FIG. 3 is a flow chart illustrating a method 300, according to an example embodiment. In particular, method 300 may be implemented to help provide an unlock screen with a fixed arrangement of input regions, where each input region can be identified by saying a word or phrase (e.g., the "image-name") corresponding to the image that is displayed in the input region.

More specifically, while a computing device is locked, the computing device may display an interface that includes a fixed arrangement of input regions, where an image from a set of images is displayed in each input region, and where each input region is associated with an image-name for the image that is displayed in the input region, as shown by block 302. While displaying the interface, the computing device may receive audio data that includes speech, as shown by block 304. Further, the computing device may detect a sequence of one or more of the image-names in the speech, as shown by block 306. The computing device may determine an input sequence based on the sequence of input regions that are associated with the detected sequence of image-names, as shown by block 308.

The computing device may then determine whether or not the input sequence matches a predetermined unlock sequence, as shown by block 310. If the input sequence matches the predetermined unlock sequence, then unlock the computing device, as shown by block 312. On the other hand, if the input sequence does not match the predetermined unlock predetermined unlock sequence predetermined unlock sequence sequence, then refraining from unlocking the computing device, as shown by block 314.

As noted, a computing device may dynamically assign particular images to particular input regions, such that the particular image displayed in a given input region can vary between two instances where the lock-screen is displayed. Accordingly, in some embodiments, before display of the interface, method 300 may further involve the computing device performing a selection process to select a particular image for display in each input region. In an example embodiment, the selection process may be such that the image that is selected for a given input region can vary between two instances where the selection process is performed.

Various types of selection processes may be used to assign particular images to particular input regions. For example, when a device's lock-screen interface is accessed, the device may randomly select an image from an image set for display in each input region. Alternatively, the computing device may rotate the images that are displayed in each input region according to a predetermined schedule (which will typically be complex enough that it would be difficult to remember and/or learn based on observation of a user entering the unlock sequence). Other selection processes are also possible.

As noted above, the predetermined unlock sequence may take the form of a predetermined sequence of two or more of the input regions. At block 310 of such an embodiment, to determine whether or not the input sequence matches a predetermined unlock sequence, the computing may determine whether the input regions in the input sequence match the input regions in the predetermined unlock sequence (and were identified in the same order that they appear in the unlock sequence).

As further noted above, in some embodiments of method 300, the unlock sequence may be a sequence of two or more symbols from a set of symbols. For example, the set of symbols may be a set of numbers or a set of alpha-numeric characters. Other types of symbols or combinations of symbol types are also possible. In order to facilitate entry of an unlock sequence composed of symbols, each input region may be associated with one symbol from a set of symbols. As such, at block 308, the function of determining the input sequence based on the sequence of input regions may involve the computing device: (a) determining a symbol sequence that includes the symbols associated with the input regions in the input sequence, and (b) determining whether the symbols in the symbol sequence match the symbols in the predetermined unlock sequence.

In some embodiments in which the unlock sequence includes symbols, each input region may display its associated symbol. This may assist the user in remembering which input regions correspond to the symbols in the unlock sequence. In other such embodiments, however, the associated symbols may not be displayed.

Further, in an example embodiment, each input region is statically associated with one symbol. In other words, each input region may be associated with and/or display the same symbol each time the lock-screen interface is displayed. By statically associating the symbols with input regions that are always displayed in the same arrangement, and at the same time, dynamically changing which images are displayed in which input regions, it is relatively simple for the user to enter the unlock sequence, even though the sequence of image-names that are spoken can change each time the lock-screen interface is displayed. Further, the fact that the spoken sequence of image-names can change may help to prevent a nearby person who hears a user speak the sequence from learning the underlying unlock sequence.

Note that method 300 may be particularly desirable in the context of computing devices where the display is not visible to anyone other than the user (or at least difficult for someone who is not using the device to see) and/or where a speech-based interface is commonly used. For example, an HMD, such as HMDs 152, 172 of FIGS. 1C and 1D, may have an inward-facing near-eye display that, during typical use, is not visible to anyone but the wearer. Further, in some instances, one of the most convenient ways for a user to interact with such an HMD may be through voice commands. Accordingly, when an HMD 152, 172 displays a lock-screen interface on its display 158, 180, the lock-screen interface may be difficult or even impossible for a bystander to see. Therefore, while the bystander may hear the user speaking the image-names of images in the input regions, the variation in which images are displayed in which input regions, will make it difficult for the bystander to discern which input regions are being identified by the user. Method 300 may of course be desirable in other contexts and/or for other types of computing devices as well.

In a further aspect, at block 310, the function of determining whether or not the input sequence matches the predetermined unlock sequence may be performed on-the-fly, as each image-name is detected. For example, each time a new image-name is detected in speech, the computing device may compare the corresponding input region (or the symbol associated with the corresponding image region) to the next input region (or symbol) in the unlock sequence. If the newly-inputted input region (or symbol) matches the next input region (or symbol) in the unlock sequence, then the computing device may continue the unlock process and continue to listen for image-names in incoming audio data (or, if the newly-inputted input region (or symbol) is the last input region (or symbol) in the unlock sequence, then the computing device may determine that the unlock sequence is correctly entered and responsively unlock).

On the other hand, if a newly-inputted input region (or symbol) does not match the next input region (or symbol) in the unlock sequence, then the computing device may reset the unlock process, and indicate to the user that there is been an error. Alternatively, when a newly-inputted input region (or symbol) does not match the next input region (or symbol) in the unlock sequence, the computing device may indicate this to the user and allow the user one or more additional attempts to enter the next input region (or symbol) correctly. Further, the computing device may limit the number of additional attempts that can be made to input a given input region (or symbol) in the unlock sequence, and/or may limit the number of total additional attempts to identify input regions (or symbols) that can be made during the entire process of inputting the unlock sequence.

In other embodiments, the computing device may not compare input regions (or symbols) as they are indicated. Instead, at block 310, the computing device may wait until the input sequence is completely entered (e.g., until the number of input regions or symbols that have been indicated is the same as the number included in the unlock sequence), and then determine whether the input pattern matches the predetermined unlock pattern.

IV. EXAMPLES OF LOCK-SCREEN INTERFACES

Figure 4:
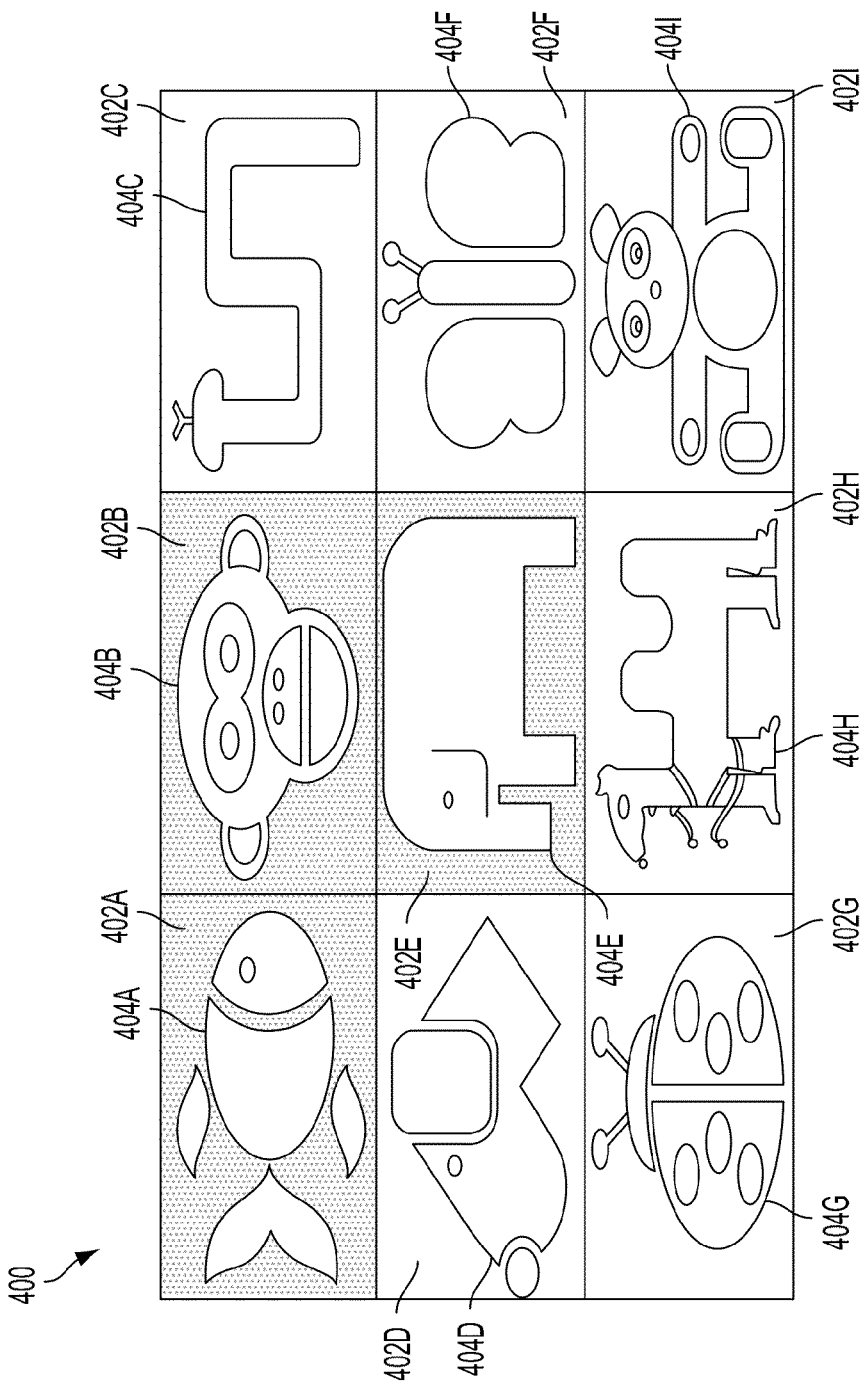
FIG. 4 is an illustration of a lock-screen interface that may be displayed by a computing device, according to an example embodiment.

FIG. 4 is an illustration of a lock-screen interface 400 that may be displayed by a computing device, according to an example embodiment. Lock-screen interface 400 may be provided by or in association with an example method, such as method 300.

As shown, the interface 400 includes a three-by-three grid of input regions 402A to 402I. Further, images 404A to 404I are displayed in input regions 402A to 402I, with image 404A being displayed in input region 402A, image 404B being displayed in input region 402B, and so on.

In the illustrated embodiment, images 404A to 404I are selected from a set of images of animals. In particular, images 404A to 404I show a fish, a monkey, a snake, a dog, an elephant, a butterfly, a ladybug, a camel, and a panda, respectively. In such an embodiment, the lock-screen interface may be considered to have an animal theme. Further, the computing device may be configured to allow a user to select a theme for the lock-screen interface, such as an animal theme, from a number of available themes, which each have a corresponding set of images. Further, the type of images displayed in the input regions may vary (with or without implementation of lock-screen themes).

When a computing device displays the lock-screen interface 400, the device may enable speech recognition capabilities in order to listen for image-names of the images 404A to 404I. Therefore, to enter an unlock sequence, user may then say the image-names of the images displayed in the input regions that make up the unlock sequence. For example, consider the scenario where the unlock sequence is input region 404B, followed by input region 404I, followed by input region 404B again, followed input region 404C, and finally followed by input region 404A. In this scenario, the user may enter the unlock sequence by saying "monkey", then saying "panda", then saying "monkey" again, then saying "snake", and lastly saying "fish." Other examples are also possible.

As noted above, while interface 400 includes images of animals in the input regions, other types of images may also be utilized by interface 400 and other interfaces in accordance with an example embodiment, without departing from the scope of the invention.

As another example, a lock-screen interface could also utilize images of friends' faces. Further, a set of images might be automatically generated or selected by the user from images in a user's social network account (e.g., profile pictures from accounts of a user's friends), a user's contacts, or another image source or combination of image sources. In such an embodiment, the images-name associated with the image of a given friend could be the friend's name. Accordingly, the computing device may implement a speech recognition process to listen for the names of those friends whose images are displayed in the input regions. The user may then identify the sequence of input regions corresponding to the unlock sequence by speaking the names of the friends whose images are displayed in the sequence of input regions.

As an additional example, a lock-screen interface could utilize images of places (e.g., countries, cities, buildings, landmarks, etc.). In such an embodiment, the images-name associated with the image of a given place may be the name of the place (e.g., a country name, a city name, a building name or address, a landmark name, etc.). Accordingly, the computing device may implement a speech recognition process to listen for the names of those places for which images are displayed in the input regions. The user may then identify the sequence of input regions corresponding to the unlock sequence by speaking the names of the places for which images are displayed in the sequence of input regions.

As yet another example, a lock-screen interface could utilize generic images of common objects (e.g., a tree, a basketball, a house, a dog, a computer, etc.). In such an embodiment, the images-name associated with the image of a given place may be the name of the common object. Accordingly, the computing device may implement a speech recognition process to listen for the names of those objects for which images are displayed in the input regions. The user may then identify the sequence of input regions corresponding to the unlock sequence by speaking the names of the objects that are displayed in the sequence of input regions.

As a further example, a lock-screen interface could utilize colored input regions. In other words, the "image" displayed in a given input region may simply be a particular color (e.g., red, green, blue, yellow, red, black, white, etc.). In such an embodiment, the images-name associated a given input region may be the name of the color displayed in the input region. Accordingly, the computing device may implement a speech recognition process to listen for the names of those colors that are displayed in the input regions. The user may then identify the sequence of input regions corresponding to the unlock sequence by speaking the names of the colors that are displayed in the sequence of input regions. Other types of images may also be displayed in input regions, without departing from the scope of the invention.

Figure 5:
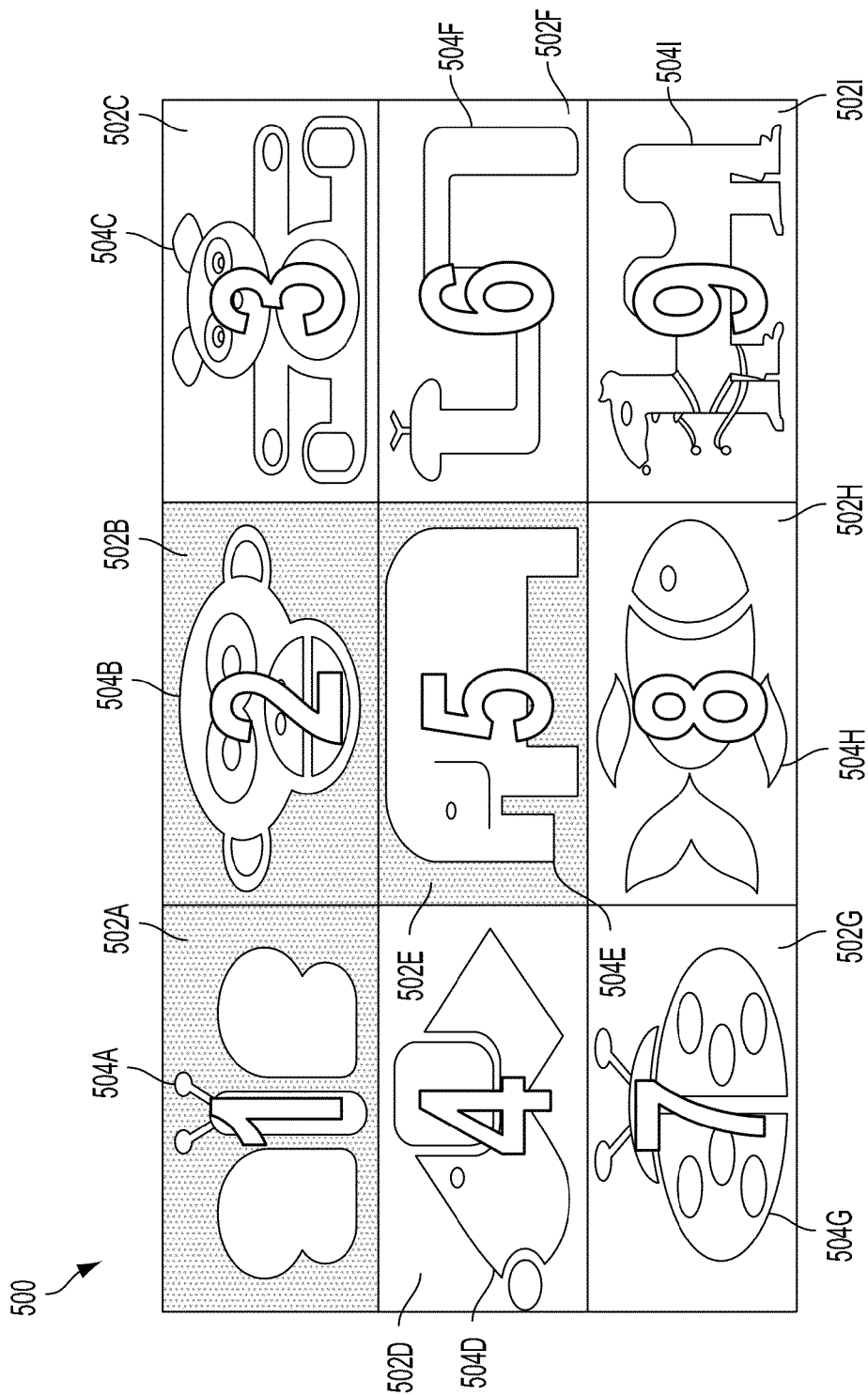
FIG. 5 is an illustration of a lock-screen interface in which input regions are associated with symbols, according to an example embodiment.

FIG. 5 is an illustration of a lock-screen interface 500 in which input regions are associated with symbols, according to an example embodiment. As such, lock-screen interface 500 may facilitate entry of unlock sequence that takes the form of a sequence of symbols.

As shown, the interface 500 includes a three-by-three grid of input regions 502A to 502I. Further, images 504A to 504I are displayed in input regions 502A to 502I, with image 504A being displayed in input region 502A, image 504B being displayed in input region 502B, and so on. In the illustrated embodiment, images 504A to 504I are again selected from a set of images of animals. In particular, images 504A to 504I show a butterfly, a monkey, a panda, a dog, an elephant, a snake, a ladybug, a fish, and a camel, respectively.

Further, each input region 502A to 502I is associated with a symbol from a set of symbols. In particular, each input region 502A to 502I is associated with a number from the set including numbers 1 through 9. In the illustrated example, each input region 502A to 502I displays its associated number 1 to 9, respectively.

When interface 500 is displayed, a user may enter the sequence of numbers making up an unlock sequence by speaking the names of the animals displayed in the input regions that are associated with the numbers in the unlock sequence. For example, consider the scenario where the unlock sequence is 1-2-5-6. In this scenario, the user may enter the unlock sequence by saying "butterfly", then saying "monkey", then saying "snake", and then saying "ladybug." Other examples are also possible.

In a further aspect, while the examples shown in FIGS. 4 and 5 may suggest that there by a one-to-one ration between the number of images in the image set and the number of input regions, the number of images in the image set can be greater than or less than the number of input regions in the lock-screen interface.

In another aspect, the images used in a lock-screen interface may be of various different formats or of the same format. Further, the images could be computer-generated graphics and/or could be photographs.

In another aspect, an illustrative computing device may be configured to allow a user to specify the images to include in the image set for the lock-screen interface. Additionally or alternatively, an illustrative computing device may be configured to allow a user to define the image-names for particular images in the image set, and possibly to train the computing device to detect the image-names in audio data that capture's the user's speech.

In a further aspect, while FIGS. 4 and 5 both show lock-screen interfaces with a three-by-three grid of rectangular input regions, input regions may vary in size and/or shape, without departing from the scope of the invention. Further, the number of input regions in a lock-screen interface and/or the arrangement of the input regions may vary, without departing from the scope of the invention.

In another aspect, a computing device may provide audio feedback indicating when the user has correctly inputted each input region or symbol in an unlock sequence, and/or to indicate when a user Additionally or alternatively, a computing device may provide audio feedback indicating when the user has correctly provided the entire unlock sequence.

In some embodiments, when an attempt to input an unlock sequence is determined to have failed (e.g., when an input sequence does not match the predetermined unlock sequence), a computing device may reset the lock-screen interface and allow one or more additional attempts to input the unlock pattern. Further, a computing device may implement a process that provides additional security in the event of multiple unsuccessful attempts to input the unlock pattern. For example, after a certain number of unsuccessful attempts, the computing device may responsively disable the lock-screen for a certain period of time (referred to herein as a "lockout period"), such that the user cannot unlock the device.

Further, if additional unsuccessful attempts are made after the lockout period ends, the computing device may increase the duration of a subsequent lockout period. As a specific example, a computing device could lock a user out for one minute after five unsuccessful attempts, for an hour after five more unsuccessful attempts (e.g., ten unsuccessful attempts in total), for a day after five more unsuccessful attempts (e.g., fifteen unsuccessful attempts in total), and so on. Other examples are also possible.

V. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computing device comprising:
a non-transitory computer readable medium; and
program instructions stored on the non-transitory computer readable medium and executable by at least one processor to:
while a computing device is locked, cause a display of the computing device to display an interface comprising a fixed arrangement of input regions, wherein an image from a set of images is displayed in each input region, wherein each input region is associated with an image-name for the image that is displayed in the input region, wherein each input region is statically associated with a symbol from a set of symbols, such that each input region is associated with the same symbol each time the interface is displayed, wherein each input region also displays the symbol associated with the input region, and the symbol displayed in each input region is different from the image-name associated with the image displayed in the same input region;
receive audio data that comprises speech;
detect a sequence of one or more of the image-names in the speech;
determine an input sequence comprising the one or more input regions that are associated with the detected sequence of one or more image-names;
determine whether or not the input sequence matches a predetermined unlock sequence comprising a predetermined sequence of two or more of the symbols from the set of symbols;
when the input sequence matches the predetermined unlock sequence, unlock the computing device; and
when the input sequence does not match the predetermined unlock sequence, refrain from unlocking the computing device.

2. The computing device of claim 1, further comprising program instructions stored on the non-transitory computer readable medium and executable by at least one processor to:
before display of the interface, perform a selection process to select, for each input region, the image from the image set for display in the input region, wherein the image selected for a given input region is variable each time the selection process is performed.

3. The computing device of claim 1, wherein the set of symbols comprises a set of alpha-numeric characters.

4. The computing device of claim 1, wherein the set of symbols comprises a set of numbers.

5. The computing device of claim 4, wherein the set of numbers includes numbers 1 through 9.

6. The computing device of claim 1, wherein the set of images comprises images of one or more of: (a) animals, (b) faces, (c) places, (d) common objects, and (e) colors.

7. The computing device of claim 1:
wherein a predetermined unlock sequence corresponds to a predetermined sequence of two or more of the input regions; and
wherein determining whether or not the input sequence matches a predetermined unlock sequence comprises determining whether the symbols displayed in the input regions in the input sequence match the symbols in the predetermined unlock sequence.

8. The computing device of claim 1:
wherein determining whether or not the input sequence matches a predetermined unlock sequence comprises: (a) determining a symbol sequence comprising the symbols associated with the input regions in the input sequence, and (b) determining whether the symbols in the symbol sequence match the symbols in the predetermined unlock sequence.

9. The computing device of claim 1, wherein program instructions stored on the non-transitory computer readable medium and executable by at least one processor to:
when the interface is displayed, enable a speech-recognition process to listen for at least the one or more image names in the audio data.

10. A computer implemented method comprising:
while a computing device is locked, displaying an interface that comprises a fixed arrangement of input regions, wherein an image from a set of images is displayed in each input region, wherein each input region is associated with an image-name for the image that is displayed in the input region, wherein each input region is statically associated with a symbol from a set of symbols, such that each input region is associated with the same symbol each time the interface is displayed, wherein each input region also displays the symbol associated with the input region, and the symbol displayed in each input region is different from the image-name associated with the image displayed in the same input region;
receiving audio data that comprises speech;
detecting a sequence of one or more of the image-names in the speech;
determining an input sequence based on the one or more input regions that are associated with the detected sequence of one or more image-names;
determining whether or not the input sequence matches a predetermined unlock sequence comprising a predetermined sequence of two or more of the symbols from the set of symbols;
if the input sequence matches the predetermined unlock sequence, then unlocking the computing device; and
if the input sequence does not match the predetermined unlock sequence, then refraining from unlocking the computing device.

11. The method of claim 10, further comprising:
before displaying the interface, performing a selection process to select, for each input region, the image from the image set for display in the input region, wherein the image selected for a given input region is variable each time the selection process is performed.

12. The method of claim 10, wherein the predetermined unlock sequence corresponds to a predetermined sequence of two or more of the input regions, and wherein determining whether or not the input sequence matches the predetermined unlock sequence comprises determining whether the symbols displayed in the input regions in the input sequence match the symbols in the predetermined unlock sequence.

13. A non-transitory computer readable medium having stored therein instructions executable by a computing device to cause the computing device to perform functions comprising:
while a computing device is locked, displaying an interface that comprises a fixed arrangement of input regions, wherein an image from a set of images is displayed in each input region, and wherein each input region is associated with an image-name for the image that is displayed in the input region, wherein each input region is statically associated with a symbol from a set of symbols, such that each input region is associated with the same symbol each time the interface is displayed, wherein each input region also displays the symbol associated with the input region, and the symbol displayed in each input region is different from the image-name associated with the image displayed in the same input region;
receiving audio data that comprises speech;
detecting a sequence of one or more of the image-names in the speech;
determining an input sequence based on the one or more input regions that are associated with the detected sequence of one or more image-names;
determining whether or not the input sequence matches a predetermined unlock sequence comprising a predetermined sequence of two or more of the symbols from the set of symbols;
when the input sequence matches the predetermined unlock sequence, unlocking the computing device; and
when the input sequence does not match the predetermined unlock sequence, refraining from unlocking the computing device.

14. The non-transitory computer readable medium of claim 13, wherein the functions further comprise:
before displaying the interface, performing a selection process to select, for each input region, the image from the image set for display in the input region, wherein the image selected for a given input region is variable each time the selection process is performed.

15. The non-transitory computer readable medium of claim 13, wherein the predetermined unlock sequence corresponds to a predetermined sequence of two or more of the input regions, and wherein determining whether or not the input sequence matches the predetermined unlock sequence comprises determining whether the symbols displayed in the symbols in the input sequence match the input regions in the predetermined unlock sequence.

16. The non-transitory computer readable medium of claim 13 wherein determining whether or not the input sequence matches a predetermined unlock sequence comprises: (a) determining a symbol sequence comprising the symbols associated with the input regions in the input sequence, and (b) determining whether the symbols in the symbol sequence match the symbols in the predetermined unlock sequence.

* * * * *